No. 857,375. PATENTED JUNE 18, 1907.
L. ARNSON.
RECEIVING APPARATUS FOR WIRELESS TELEGRAPHY.
APPLICATION FILED DEC. 20, 1905.

2 SHEETS—SHEET 1.

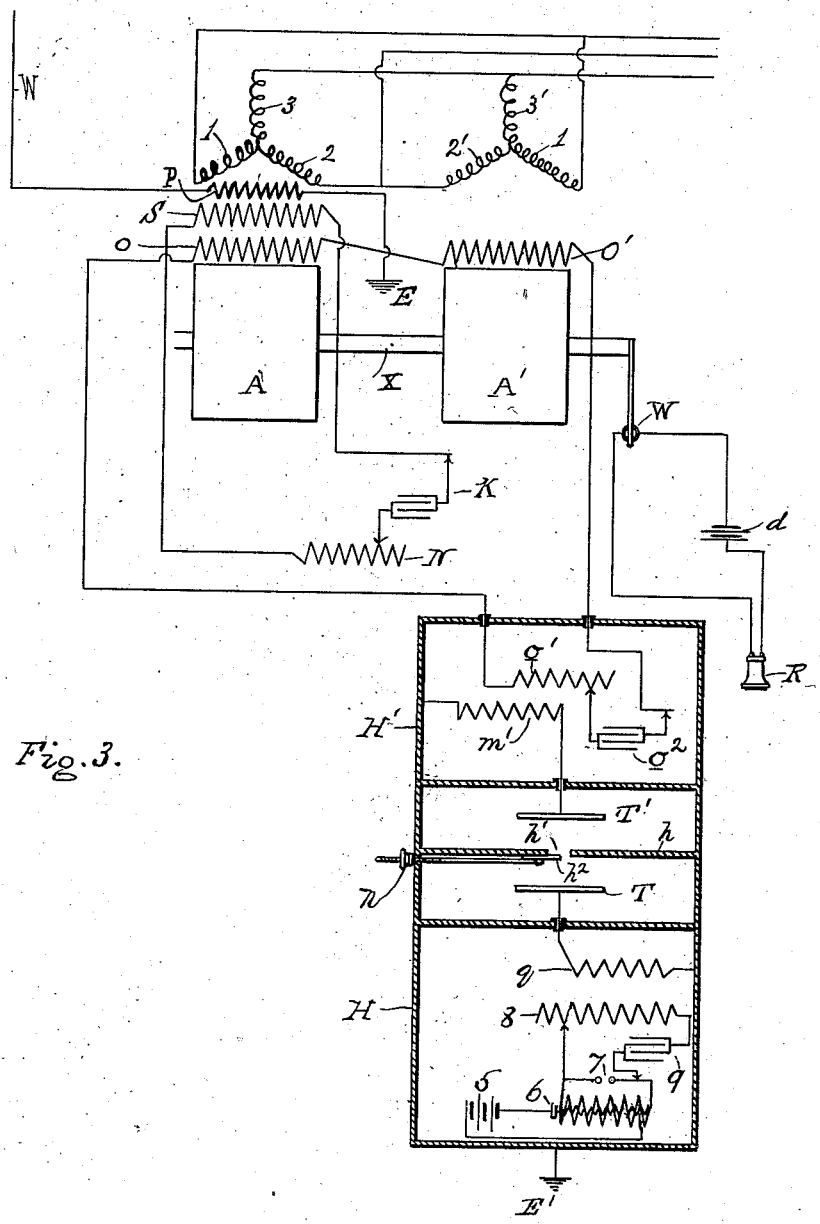

UNITED STATES PATENT OFFICE.

LUDWIG ARNSON, OF NEW YORK, N. Y.

RECEIVING APPARATUS FOR WIRELESS TELEGRAPHY.

No. 857,375. Specification of Letters Patent. Patented June 18, 1907.

Application filed December 20, 1905. Serial No. 292,582.

*To all whom it may concern:*

Be it known that I, LUDWIG ARNSON, a citizen of the United States of America, and residing in the borough of Manhattan, in the city, county, and State of New York, have invented certain new and useful Improvements in Receiving Apparatus for Wireless Telegraphy, of which the following is a specification.

The object of my invention is to provide for wireless telegraph systems, a receiving apparatus which will be very sensitive, very reliable, and not apt to get out of order.

Figure 1:
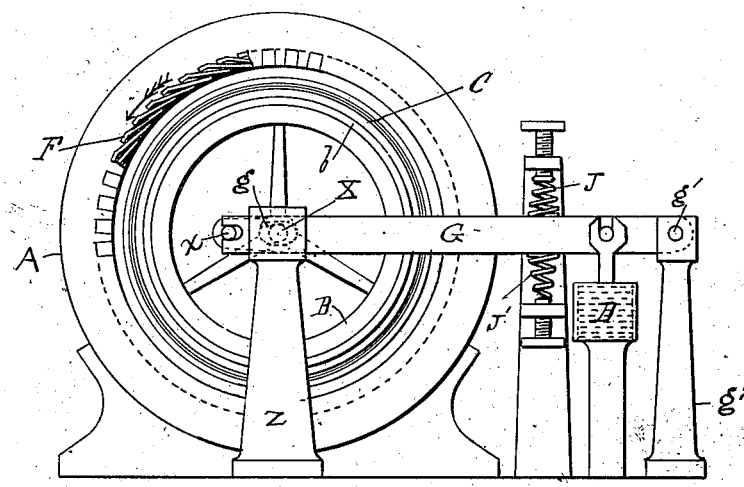
Figure 2:
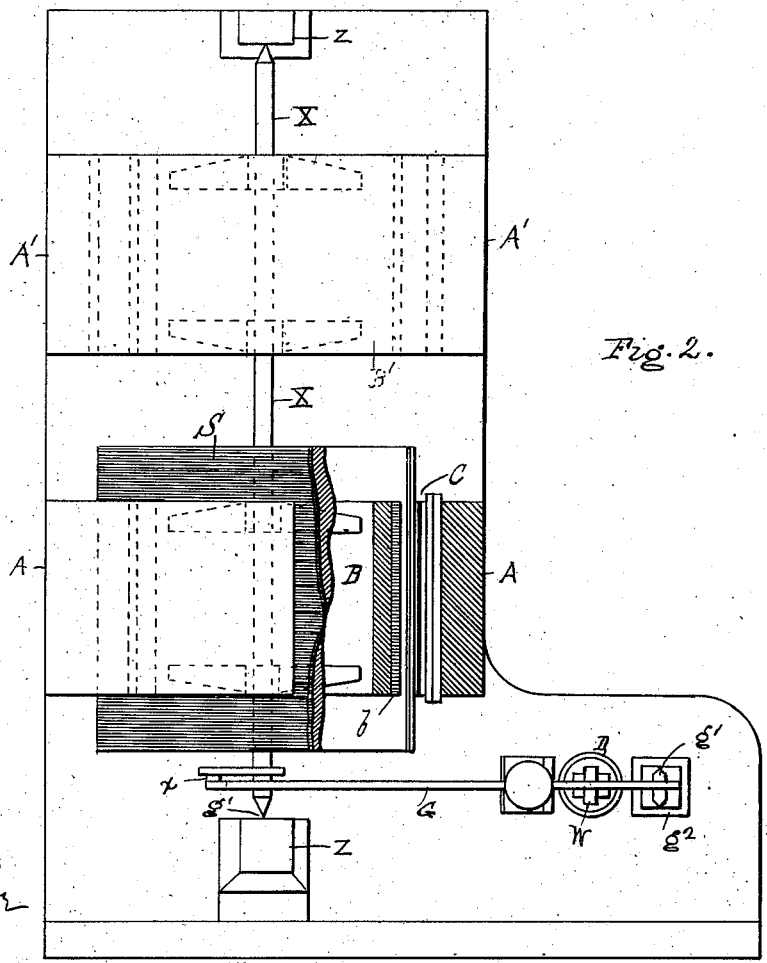

In the accompanying drawings Figure 1 is an end view of part of the apparatus; Fig. 2 is a face view of the same; partly in section; and Fig. 3 is a diagram illustrating the various circuits of the receiving apparatus.

In carrying out my invention, I provide an induction motor with a magnetic field acting upon a magnetically influenced armature to produce by hysteresis, a normal torque or moment of rotation of the armature, in combination with a counterbalancing means, such as a like motor exerting an equal torque against the first, and with these I provide means for imposing on one of the fields the oscillating waves of the aerial to cause a modification of the normal torque on the corresponding armature, and this modification is indicated or detected by suitable means, such, for example, as a telephone receiver. The motor may be of the uniphase, splitphase or polyphase alternating current type and with magnetically rotating field, but the armature should be without coils and so constructed as to avoid generation of eddy currents but to be magnetically influenced by the rotating field to give a torque by hysteritic lag. Such a motor I will here designate as a hysteresis motor.

In the drawings I have shown two like polyphase hysteresis motors, A and A¹, Fig. 2, with armatures B and B¹, preferably carried upon the same shaft X, which is mounted upon suitable bearings Z, Z, preferably jeweled. Each armature is preferably formed of bands of iron wire $b$, Fig. 2, so fixed that the lines of force never cut or cross the bands on core. These bands are insulated from each other and are fixed upon a light non-magnetic core, such as of paper. The frame of the field magnet has the windings on its inner face as usual for a polyphase induction motor. Only one set of coils is indicated at F in Fig. 1. In Fig. 3, however, I have diagrammatically indicated each motor as a three-phase motor. By virtue of these windings, 1, 2, 3, the field of the motor A rotates magnetically in the direction of the arrow, Fig. 1, for example, whereas the windings, 1¹, 2¹, 3¹, of the second motor field A¹ are such as to cause the field to rotate magnetically in the opposite direction, and consequently the normal torque on one armature B is exactly counterbalanced by the normal torque on the other armature, and the shaft X therefore normally remains stationary. Between the inner face of the field magnet of each of these motors and their armatures is left a space C, Fig. 1, corresponding to a large air gap. In this gap C in the motor A are primary and secondary windings, the primary P, Fig. 3, being in a circuit between the aerial W and a counterpoise or the earth E, while the secondary S, Fig. 3, is in a closed oscillating circuit containing a variable inductance N and capacity K. These windings P and S are wound on non-magnetic insulating cores, Fig. 2, within the field created by the coils F, Fig. 1.

Within the same space C between the field coils and the armatures in both motors, are mounted the coils O, O¹, of the local oscillatory circuit, Fig. 3, hereinafter referred to, these coils O, O¹, being wound in opposition to each other on the two motors, that is, so that any effect of electric oscillations in one is counterbalanced by the action of the other.

The two fields of the motors A and A¹, being so connected from an outside source of current, as to rotate magnetically in opposite directions, the normal torque exerted on the one armature on the shaft will be exactly counterbalanced by the normal torque exerted on the other armature, and of course no rotation of the shaft will take place. And the action of the local oscillating circuit being exerted to oppose each other in the two motors alike, that will produce no mechanical effect upon the armature, but if there be imposed upon the field of one of the motors (motor A in the case supposed), an oscillating wave from the primary of the aerial circuit, the hysteritic lag in that motor will be reduced and a torque exerted on the whole system, equal to the difference between the two opposed torques. This torque may be indicated or detected in various ways. I prefer to do it by the aid of a telephonic receiver. For this purpose the shaft X may be provided with a crank pin x acting upon a lever G, which has a slot g, Fig. 1, for the free passage of the shaft X, and is pivoted at $g^1$ to a post $g^2$. This lever acts on a plunger in a receiver D containing carbon or like resistance in series with a battery d and telephonic receiver R in a local circuit, as indicated in Fig. 3. Adjustable springs J, $J^1$, may be applied to act upon opposite sides of the lever G to tend to keep it in its normal central position.

In connection with and as part of the receiver above described, I prefer to use the tuning apparatus illustrated in Fig. 3, and comprising a local oscillatory circuit in inductive relation to the receiving oscillatory circuit. This tuning apparatus is to secure a greater degree of selectivity than has been heretofore obtained in receiving wireless telegraph messages. The method heretofore employed to tune the receiver so that it would respond to transmitted waves of only limited range of oscillatory character has consisted in placing in circuit with the detector at the receiving station oscillating circuits having predetermined adjustable capacities or condensers and inductances. By adjusting these, the tuning of the receiving apparatus may be accomplished in a limited way, but at the expense of efficiency of the receiver, since such use of condensers causes loss of energy in the receiving apparatus. I overcome this difficulty by using a local tuning circuit energized by a local source of energy at the receiving station so as to there generate in the local circuit waves of small amplitude to correspond with the waves coming in on the receiving aerial from the sending station whose messages it is desired to take. In carrying out my invention, I provide a primary circuit energized by a local battery or other generator and in this circuit is placed a coil or any other producer of high potentials and spark. Across a spark gap I place a high frequency circuit, as usually employed, containing few turns of wire and a condenser. Both of these are variable and can be adjusted for any frequency, or, expressed in another form, for wave length desired and which can be predetermined.

In inductive relation with the high frequency circuit there is placed a radiator of Hertzian waves. One end is earthed, and the other end terminates in a metallic surface having a little area for purposes of radiation. The described devices, except this last radiating surface, should be inclosed in a box, and the source of current may itself be placed in this box. This makes a complete arrangement for locally generating high frequency oscillations and Hertzian waves.

In connection with the above radiating surface, I provide a surface for absorbing the radiations emitted. Between the emitter and the absorber I place an adjustable screen. In inductive relation to this absorbing surface is another oscillating circuit containing inductance and capacity both variable, to be adjusted to correspond to the frequency of the waves generated by the local energizer, and this part of the apparatus is also inclosed in a box. This second oscillating circuit has in it the coils in the rotating magnetic field in the detector proper. The locally generated waves are thus superimposed on both of the fields equally, and, hence, have no effect on the movement of the armatures, as the torque remains equal in both directions. As there is another local oscillating circuit inductively related to the last, this will also have oscillations induced in it due to its proximity to the sympathetic tuned circuits coming out of the box. This secondary, as we may call the tuned circuit shown between the aerial and the coils in the rotary field, (forming part of the sympathetic oscillator in the box) is also affected by the waves from the aerial. The action then on the side of the receiver having the aerial is most complex, and the resultant energy component of the waves will, if weaker than the almost constant energy component of the waves induced in the other field oscillator coil, increase the torque on the aerial side and cause rotational tendency in the direction of the rotating field on the aerial side and, if stronger, vice versa. The amplitude of the locally generated oscillations is governed by the size of the adjustable aperture in the screen partition which can be regulated at will. Thus, the amplitude and the periodicity of the local circuits can be varied at will.

The local energizer comprises a battery 5, induction coil with oscillator 6, spark gap 7 and variable inductance 8 and capacity 9. The inductance 8 serves as a primary for the secondary coil q, one end of which is electrically connected to the metallic inclosing box H. This inclosing box localizes the generated oscillations. The other end of the secondary coil q passes through an insulation in the wall of the box and terminates in a metallic surface, such as a plate or rod T, capable of radiating oscillations. The inclosing box H is earthed, as indicated at $E^1$, Fig. 3.

The local sympathetic oscillator comprises a primary coil $m^1$ earthed at one end, as through the inclosing metallic casing $H^1$ which is shown as united with the casing H. At the other end, the coil $m^1$ is connected to the radiating surface T, but these two surfaces are separated from each other by a diaphragm h with an opening $h^1$ adapted to be more or less closed by a sliding or otherwise adjustable screen $h^2$. By suitably adjusting this screen (as through the nut n on the threaded stem of the screen) the opening between the two surfaces T and $T^1$ may be increased or decreased to increase or reduce the amplitude or intensity of the local oscillations to correspond with those induced in the secondary S. The primary $m^1$ acts upon the secondary $o^1$, which is at the same time part of the variable inductance of the circuit including the coils O, $O^1$, before mentioned. This circuit also contains a capacity $o^2$.

By the construction described, the battery 5 affords a means of energizing the local oscillator from a local source. The oscillations in the local primary energizing circuit 5, 6, 7, 8, and 9 induce oscillations of corresponding frequency in the secondary $q$ and these are radiated from the surface T. The oscillations radiated from the latter are received by the surface $T^1$, and their amplitude is regulated by the adjustable screen $h^2$. These oscillations thus produced in coil $m^1$ induce corresponding oscillations in the circuit containing the coil $o^1$ and also the two coils O and $O^1$ of the counterbalanced armatures of the hysteresis motor. In this way, the frequency of the local oscillations can be adjusted and regulated from a local source. The amplitude of those oscillations also can be adjusted in relation to the amplitude of the incoming waves of the aerial circuit.

The inclosing boxes H and $H^1$ protect the receiving apparatus A, $A^1$, from any undue effect of the local oscillator contained within the boxes.

I claim as my invention—

1. A receiving apparatus for wireless telegraphy, comprising a hysteresis motor, means for counterbalancing the normal torque on the armature, a primary coil for connection in the aerial circuit, a secondary in a circuit containing variable inductance and capacity, such primary and secondary being wound adjacent to the field coils of the motor, and means for indicating the resulting modifications of the torque.

2. A receiving apparatus for wireless telegraphy, comprising two motors with connecting armatures and field windings, the normal torque on one armature counterbalancing the normal torque on the other, a primary coil for connection in the aerial circuit, a secondary in a circuit containing variable inductance and capacity, such primary and secondary being wound adjacent to the field coils of one of said motors, coils in a local oscillatory circuit wound within the field of the two motors, but to counterbalance each other and means for indicating modifications of the torque.

3. A receiving apparatus for wireless telegraphy, comprising an aerial, two hysteresis motors with connected armatures and field windings, the normal torque on one armature counterbalancing the normal torque on the other, means for imposing on one of the fields wave oscillations from the aerial, a sympathetic oscillator having coils wound on the two motors but in opposition, and a local energizer or oscillator generator.

4. A receiving apparatus for wireless telegraphy, comprising an aerial, a hysteresis motor, means for imposing upon the field of the latter wave oscillations from the aerial, a sympathetic oscillator having coils in connection with said motor, a local energizer of oscillations and an inclosing metallic box.

5. A receiving apparatus for wireless telegraphy, comprising an aerial, a hysteresis motor, means for imposing upon the field of the latter wave oscillations from the aerial, a sympathetic oscillator having coils in connection with said motor, a local energizer of oscillations in inclosing box and means for reducing the action of the local energized oscillations upon the sympathetic oscillator circuit.

6. A receiving apparatus for wireless telegraphy having a local oscillator, means for varying the frequency of the oscillations, and means for varying the amplitude of the oscillations, these latter means including a local energizing circuit having a radiating surface, a local oscillating circuit having a co-operating radiating surface, and an adjustable screen between the radiating surfaces.

In testimony whereof I have signed my name to this specification, in the presence of two subscribing witnesses.

LUDWIG ARNSON.

Witnesses:
MADGE E. KEIR,
EDNA W. COLLINS.